(12) United States Patent
Chen et al.

(10) Patent No.: US 9,807,779 B2
(45) Date of Patent: Oct. 31, 2017

(54) TECHNIQUES FOR MANAGING WIRELESS COMMUNICATIONS OVER MULTIPLE CARRIERS

(71) Applicant: QUALCOMM Incorporated, San Diego, CA (US)

(72) Inventors: Wanshi Chen, San Diego, CA (US); Peter Gaal, San Diego, CA (US); Shimman Arvind Patel, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/962,871

(22) Filed: Dec. 8, 2015

(65) Prior Publication Data

US 2016/0205696 A1 Jul. 14, 2016

Related U.S. Application Data

(60) Provisional application No. 62/102,303, filed on Jan. 12, 2015.

(51) Int. Cl.
*H04W 4/00* (2009.01)
*H04W 72/08* (2009.01)
(Continued)

(52) U.S. Cl.
CPC .......... *H04W 72/085* (2013.01); *H04L 5/001* (2013.01); *H04L 5/0094* (2013.01); *H04W 24/02* (2013.01);
(Continued)

(58) Field of Classification Search
None
See application file for complete search history.

(56) References Cited

U.S. PATENT DOCUMENTS

| 2011/0243106 A1* | 10/2011 | Hsu | H04L 5/0096 370/336 |
| 2013/0039202 A1* | 2/2013 | Feuersanger | H04L 5/001 370/252 |
| 2014/0044061 A1* | 2/2014 | Yue | H04W 72/042 370/329 |

FOREIGN PATENT DOCUMENTS

EP 2816858 A1 12/2014

OTHER PUBLICATIONS

3GPP TR 25.700: "3rd Generation Partnership Project; Technical Specification Group Radio Access Network; Study on Further EUL Enhancements;" V0.4.1, Release 12, 3GPP Draft; 25700-041, 3rd Generation Partnership Project (3GPP), Mobile Competence Centre; 650, Route Des Lucioles; F-06921 Sophia-Antipolis Cedex; France, May 15, 2014 (May 15, 2014), XP050816090, pp. 1-36.
(Continued)

*Primary Examiner* — Minh-Trang Nguyen
(74) *Attorney, Agent, or Firm* — Anthony R. Morris

(57) ABSTRACT

Various aspects described herein relate to managing ultra low latency (ULL) communications over a plurality of component carriers (CC). A configuration for aggregating a set of CCs can be received, wherein the set of CCs includes at least a primary cell and a secondary cell. Based on the received configuration, at least the primary cell can be communicated with for legacy communications, wherein the legacy communications are based on a first transmission time interval (TTI) having a first duration. Based on the received configuration, the primary cell and the secondary cell can be communicated with for ULL communications, wherein the ULL communications are based on a second TTI having a second duration that is less than the first duration.

30 Claims, 7 Drawing Sheets

(51) Int. Cl.
*H04W 72/04* (2009.01)
*H04W 24/02* (2009.01)
*H04L 5/00* (2006.01)

(52) U.S. Cl.
CPC ....... *H04W 72/0453* (2013.01); *H04L 5/0098* (2013.01)

(56) References Cited

OTHER PUBLICATIONS

International Search Report and Written Opinion—PCT/US2015/064645—ISA/EPO—Mar. 4, 2016. 12 Total Pages.

\* cited by examiner

TECHNIQUES FOR MANAGING WIRELESS COMMUNICATIONS OVER MULTIPLE CARRIERS

CLAIM OF PRIORITY UNDER 35 U.S.C. §119

The present application for patent claims priority to Provisional Application No. 62/102,303 entitled "TECHNIQUES FOR MANAGING WIRELESS COMMUNICATIONS OVER MULTIPLE CARRIERS" filed Jan. 12, 2015, which is assigned to the assignee hereof and hereby expressly incorporated by reference herein.

BACKGROUND

Described herein are aspects generally related to communication systems, and more particularly, to managing wireless communications over multiple carriers.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of managing ultra low latency (ULL) communications over a plurality of component carriers (CC) is provided. The method includes receiving a configuration for aggregating a set of CCs, where the set of CCs includes at least a primary cell and a secondary cell. The method also includes communicating, based on the received configuration, with at least the primary cell for legacy communications, wherein the legacy communications are based on a first transmission time interval (TTI) having a first duration, and communicating, based on the received configuration, with at least one of the primary cell or the secondary cell for ULL communications, wherein the ULL communications are based on a second TTI having a second duration that is less than the first duration.

In other aspects, an apparatus for managing ULL communications over a plurality of CCs is provided. The apparatus includes at least one processor, and a memory communicatively coupled with the at least one processor. The at least one processor is configured to receive a configuration for aggregating a set of CCs, wherein the set of CCs includes at least a primary cell and a secondary cell. The at least one processor is also configured to communicate, based on the received configuration, with at least the primary cell for legacy communications, wherein the legacy communications are based on a first TTI having a first duration, and communicate, based on the received configuration, with at least one of the primary cell or the secondary cell for ULL communications, wherein the ULL communications are based on a second TTI having a second duration that is less than the first duration.

In another example, an apparatus for managing ULL communications over a plurality of CCs is provided. The apparatus includes means for receiving a configuration for aggregating a set of CCs, where the set of CCs includes at least a primary cell and a secondary cell. The apparatus also includes means for communicating, based on the received configuration, with at least the primary cell for legacy communications, wherein the legacy communications are based on a first TTI having a first duration, and means for communicating, based on the received configuration, with at least one of the primary cell or the secondary cell for ULL communications, wherein the ULL communications are based on a second TTI having a second duration that is less than the first duration.

In other aspects, a computer-readable storage medium including computer-executable code for managing ULL communications over a plurality of CCs is provided. The code includes code to receive a configuration for aggregating a set of CCs, where the set of CCs includes at least a primary cell and a secondary cell. The code also includes code to communicate, based on the received configuration, with at least the primary cell for legacy communications, wherein the legacy communications are based on a first TTI having a first duration, and code to communicate, based on the received configuration, with at least one of the primary cell or the secondary cell for ULL communications, wherein the ULL communications are based on a second TTI having a second duration that is less than the first duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
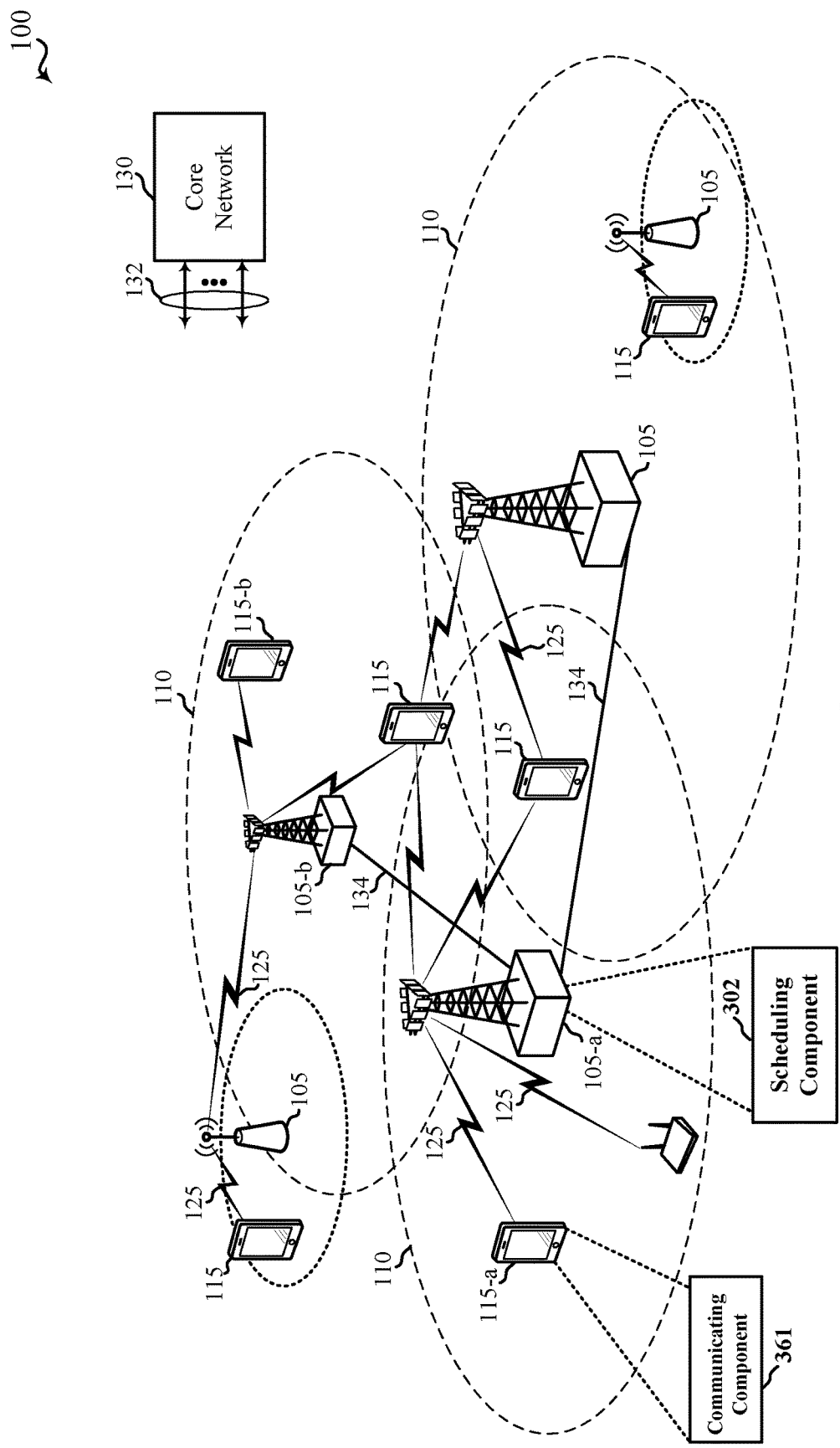
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to allocating traffic data resources in wireless communications. For example, an ultra low latency (ULL) wireless technology may be defined as based on a shorter transmission time interval (TTI) than an existing legacy wireless technology. In one specific example, in long term evolution (LTE), which is based on a TTI of 1 millisecond (ms) (1 subframe), ULL LTE can be defined as based on a TTI having a duration less than a subframe (e.g., one symbol, two symbols, a subframe slot, etc.). In this regard, a lower latency in communications is achieved by the shorter, more frequent TTI. It is possible, in some configurations, that the UE can be configured to communicate over a first component carrier (CC) using legacy LTE and ULL LTE resources, while also configured to communicate over a second CC using legacy LTE resources and no ULL LTE resources or ULL LTE resource and no legacy LTE resources (e.g. in uplink and/or downlink communications). The UE can activate and deactivate ULL LTE over the second CC based on the legacy LTE resources, or vice versa (e.g., use ULL LTE resources to activate/deactivate legacy LTE resources). The UE can accordingly determine a latency for activating/deactivating communications over the second CC based on whether legacy LTE or ULL LTE is enabled over the second CC. Moreover, the ULL LTE communications over the second CC may correspond to carrying at least one of uplink and/or downlink communications.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to activate/deactivate one or more CCs or allocate resources for communicating using legacy or ULL communications to one or more UEs 115, as described further herein. Similarly, one or more of UEs 115 may include a communicating component 361 configured to receive information related to activating/deactivating a CC and/or resources for communicating using legacy or ULL communications with the access points 105. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communications links. The wireless communications system 100 may support operation on multiple carriers (waveform signals of different frequencies). Multi-carrier transmitters can transmit modulated signals simultaneously on the multiple carriers. For example, each of communications links 125 may be a multi-carrier signal modulated according to the various radio technologies described above. Each modulated signal may be sent on a different carrier and may carry control information (e.g., reference signals, control channels, etc.), overhead information, data, etc. For example, the multiple carriers can be with multiple cells (e.g., a primary cell and one or more secondary cells, or a set of primary cells with sets of one or more corresponding secondary cells, as described below).

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-a may communicate with access point 105-a on both a first hierarchical layer that supports first layer transmissions using a first TTI (also referred to herein as "legacy communications") and a second hierarchical layer that supports second layer transmissions using a second TTI, which may be shorter than the first TTI (also referred to herein as "ULL communications").

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit communications related to the first or second hierarchical layer only or may transmit communications for both the first and second hierarchical layers. Where an access point 105-b supports both the first and second hierarchical layers, communicating component 361 can be configured to prioritize communications received from the access point 105-b that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communications links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity, or other schemes. MIMO techniques use multiple antennas on the access points 105 and/or multiple antennas on the UEs 115 to transmit multiple data streams.

For example, carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization. In multiple connectivity, for example, UE 115 can be configured with at least one primary cell (PCell) configured to support uplink and downlink communications between UE 115 and an access point 105. It is to be appreciated that there can be a PCell for each of one or more communications links 125 between a UE 115 and a given access point 105. In addition, each of the communications links 125 can have one or more secondary cells (SCell) that can support uplink and/or downlink communications as well. In some examples, the PCell can be used to communicate at least a control channel, and the SCell can be used to communicate a data channel. The UE 115 may have multiple PCell links with multiple access points and/or multiple SCell links with multiple access points. In any case, in a multiple carrier configuration, the UE 115 can establish CCs with each PCell and/or SCell.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
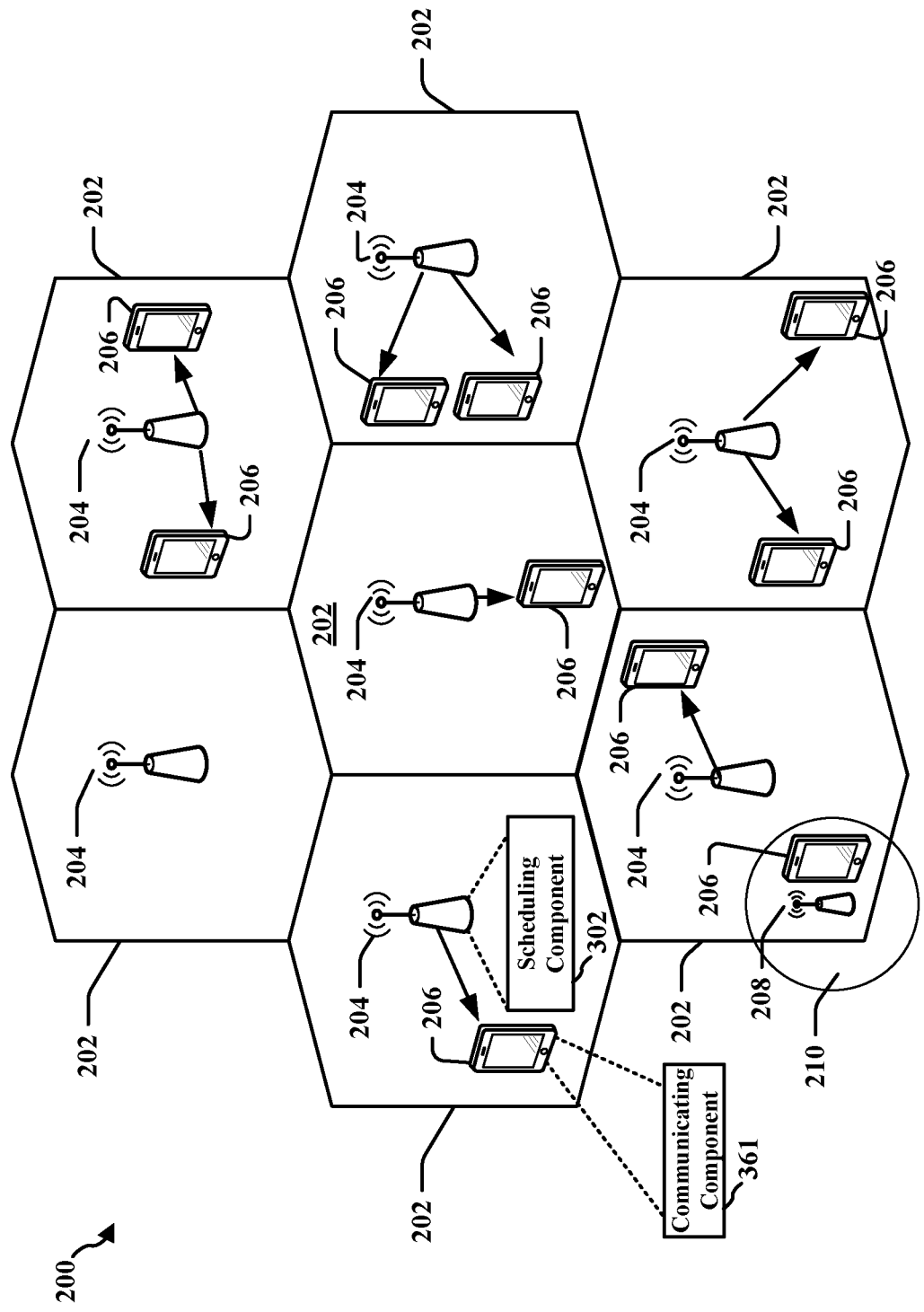
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 can be provided that may be of a lower power class and may have cellular regions 210 that overlap with one or more of the cells 202. The small cell eNBs 208 may be or may provide a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 (or small cell eNBs 208) may include scheduling component 302 configured to activate/deactivate one or more CCs or allocate resources for communicating using legacy or ULL communications to one or more UEs 206, as described further herein. Similarly, one or more of UEs 206 may include a communicating component 361 configured to receive information related to activating/deactivating a CC and/or resources for communicating using legacy or ULL communications with the eNBs 204 and/or 208. There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNBs 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
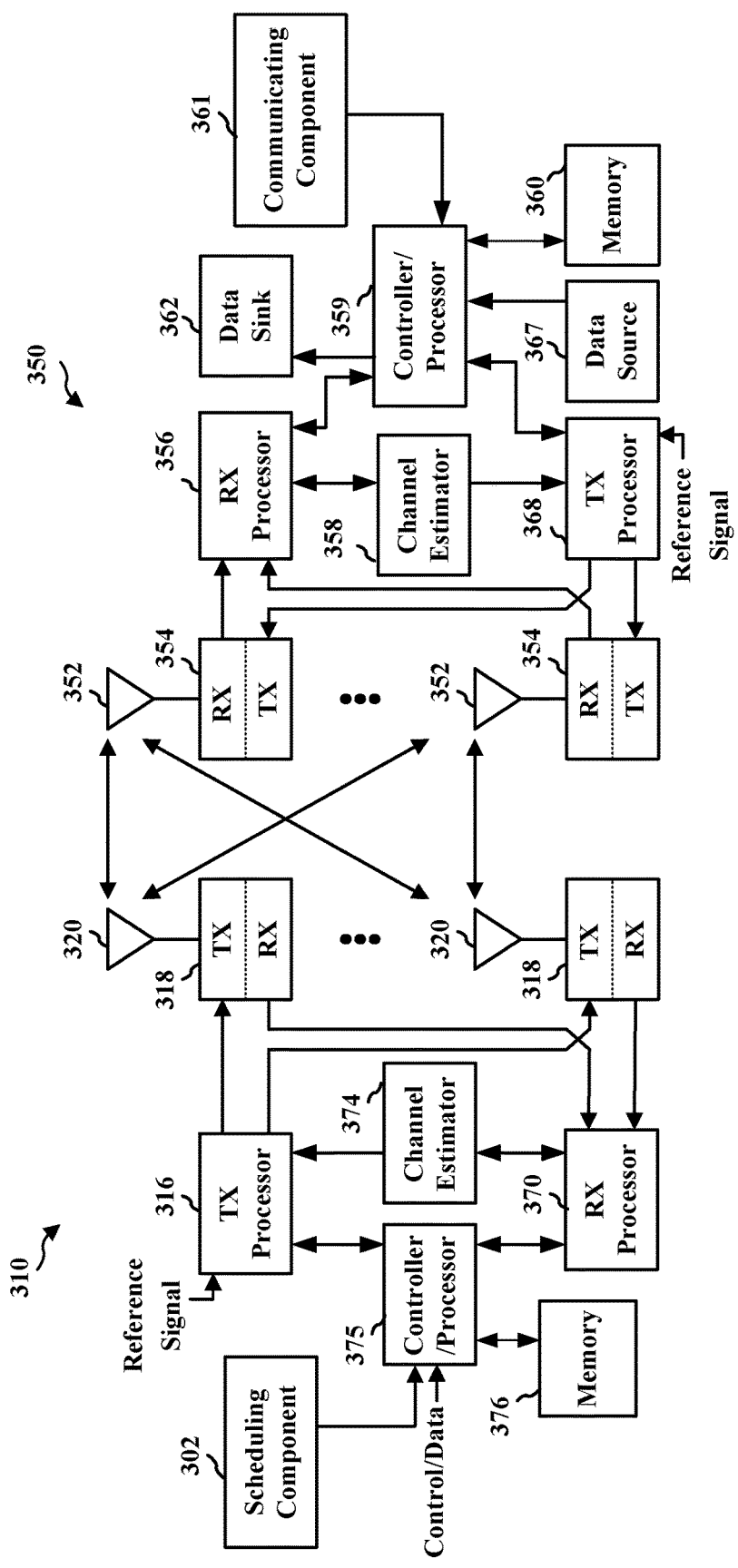
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include scheduling component 302 configured to activate/deactivate one or more CCs or allocate resources for communicating using legacy or ULL communications to one or more UEs 350, as described further herein. Though scheduling component 302 is shown as coupled to controller/processor 375, it is to be appreciated that scheduling component 302 can also be coupled to other processors (e.g., RX processor 370, TX processor 316, etc.) and/or implemented by the one or more processors 316, 370, 375 to perform actions described herein At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 configured to receive information related to activating/deactivating a CC and/or resources for communicating using legacy or ULL communications with the eNB 310. Though communicating component 361 is shown as coupled to controller/processor 359, it is to be appreciated that communicating component 361 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
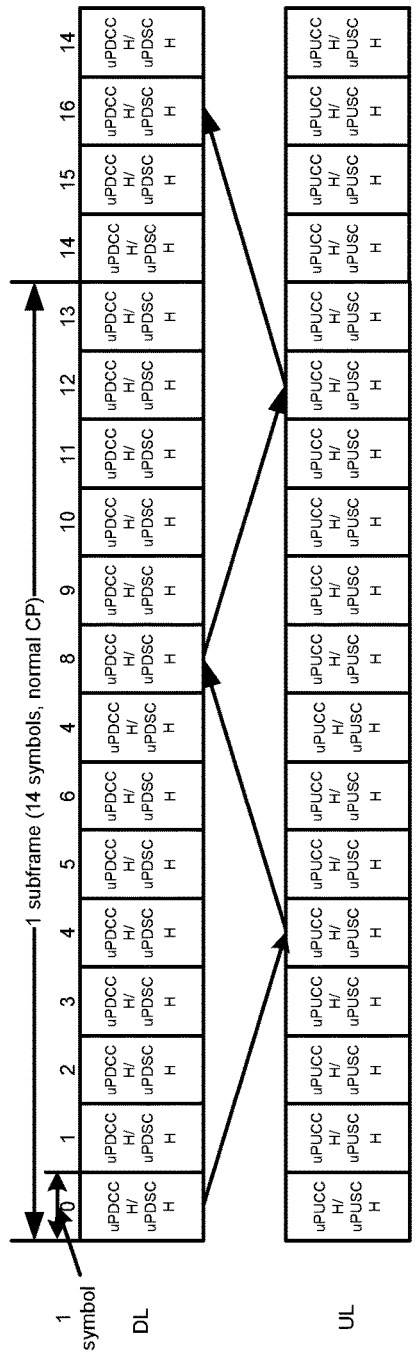
FIG. 4 is a diagram illustrating example timelines for uplink bandwidth allocation.
Figure 4:
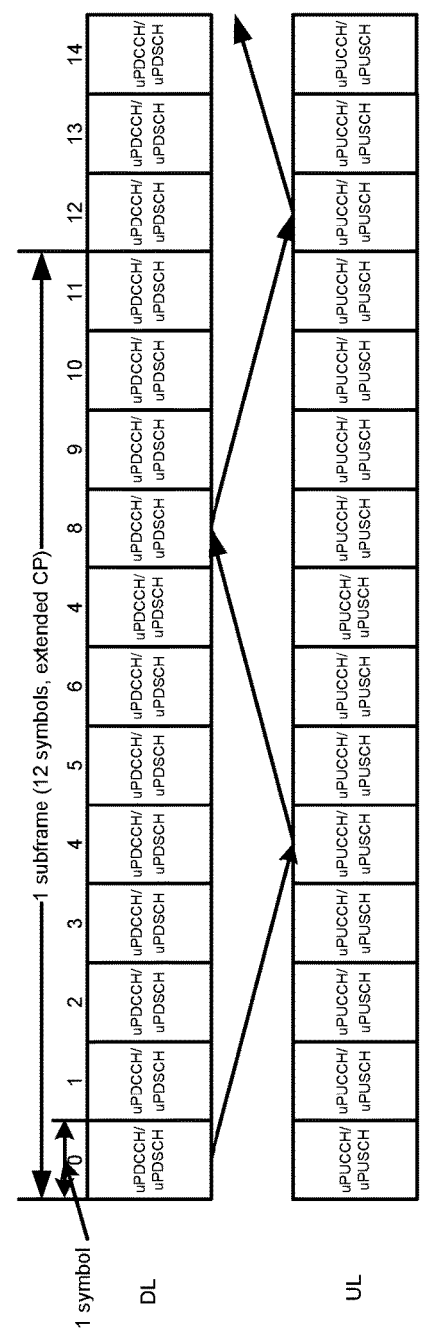

FIG. 4 is a diagram illustrating non-limiting examples of a ULL timelines 400, 402, with time extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. It is to be appreciated, in other examples, that a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe.

Figure 5:
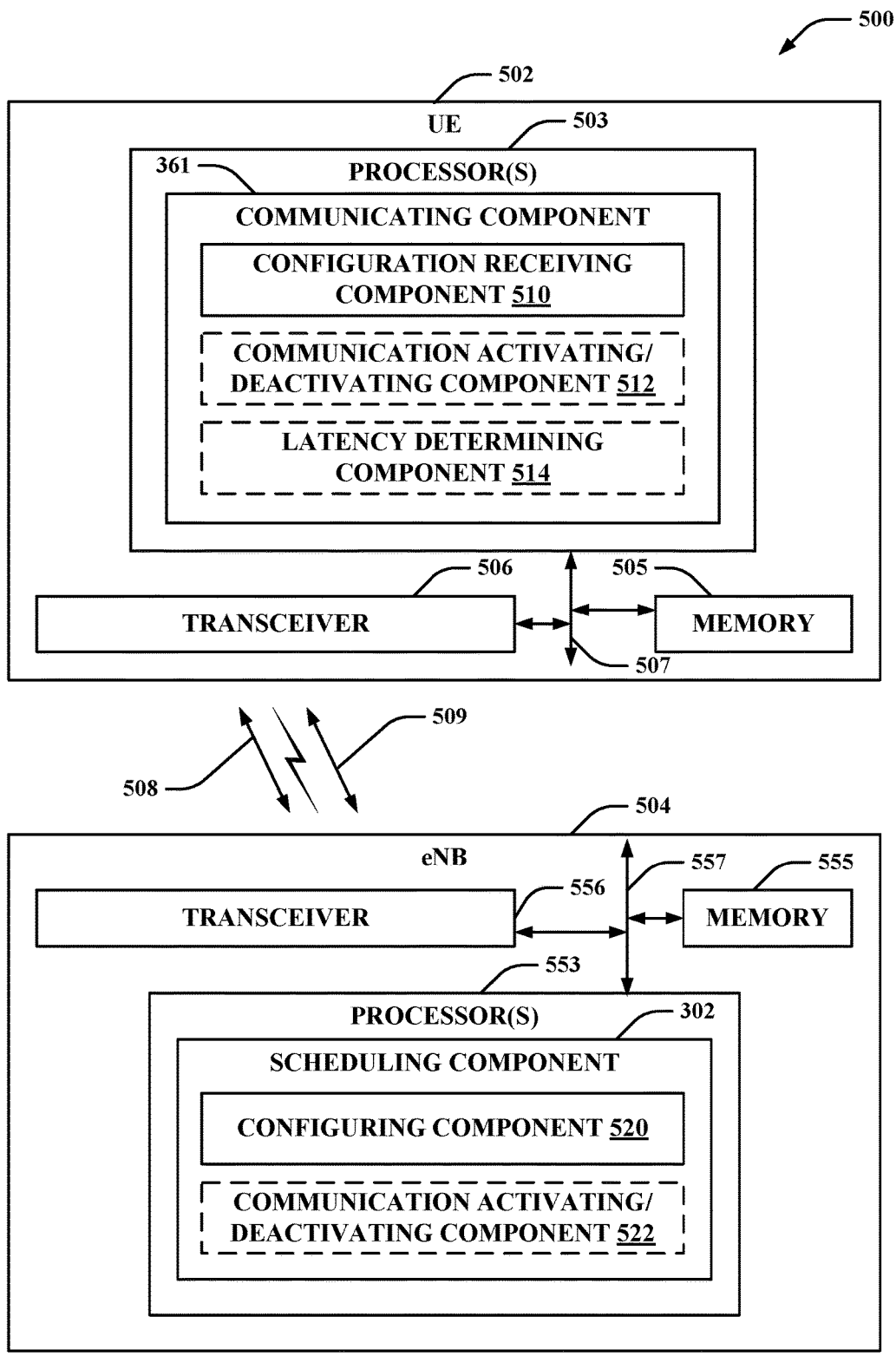
FIG. 5 is a diagram illustrating an example system for managing ultra low latency (ULL) communications over a plurality of component carriers (CC) in accordance with aspects described herein.
Figure 6:
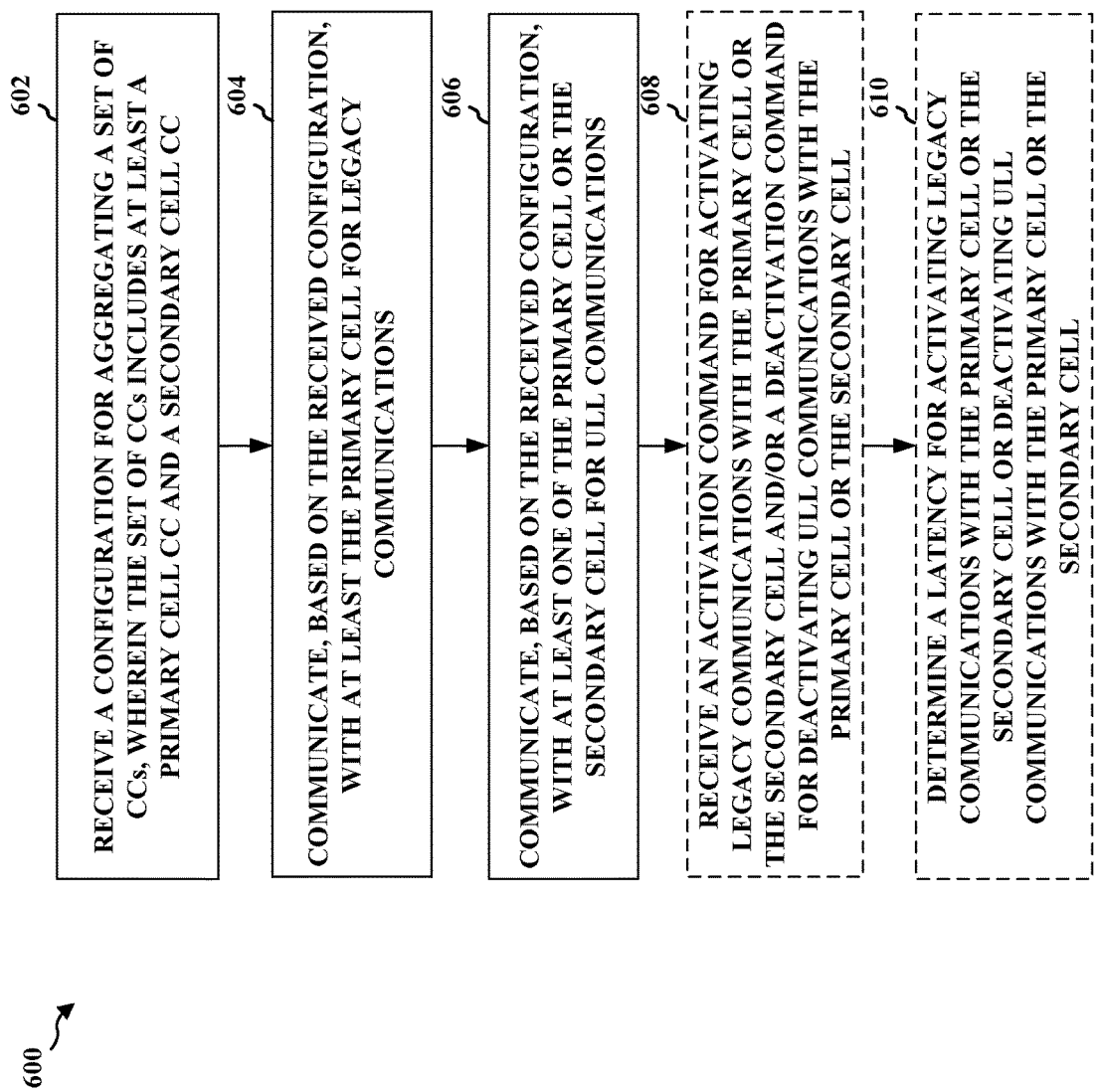
FIG. 6 is a flow chart of an example method of communicating using a ULL and/or a legacy communication technology over a plurality of CCs in accordance with aspects described herein.
Figure 7:
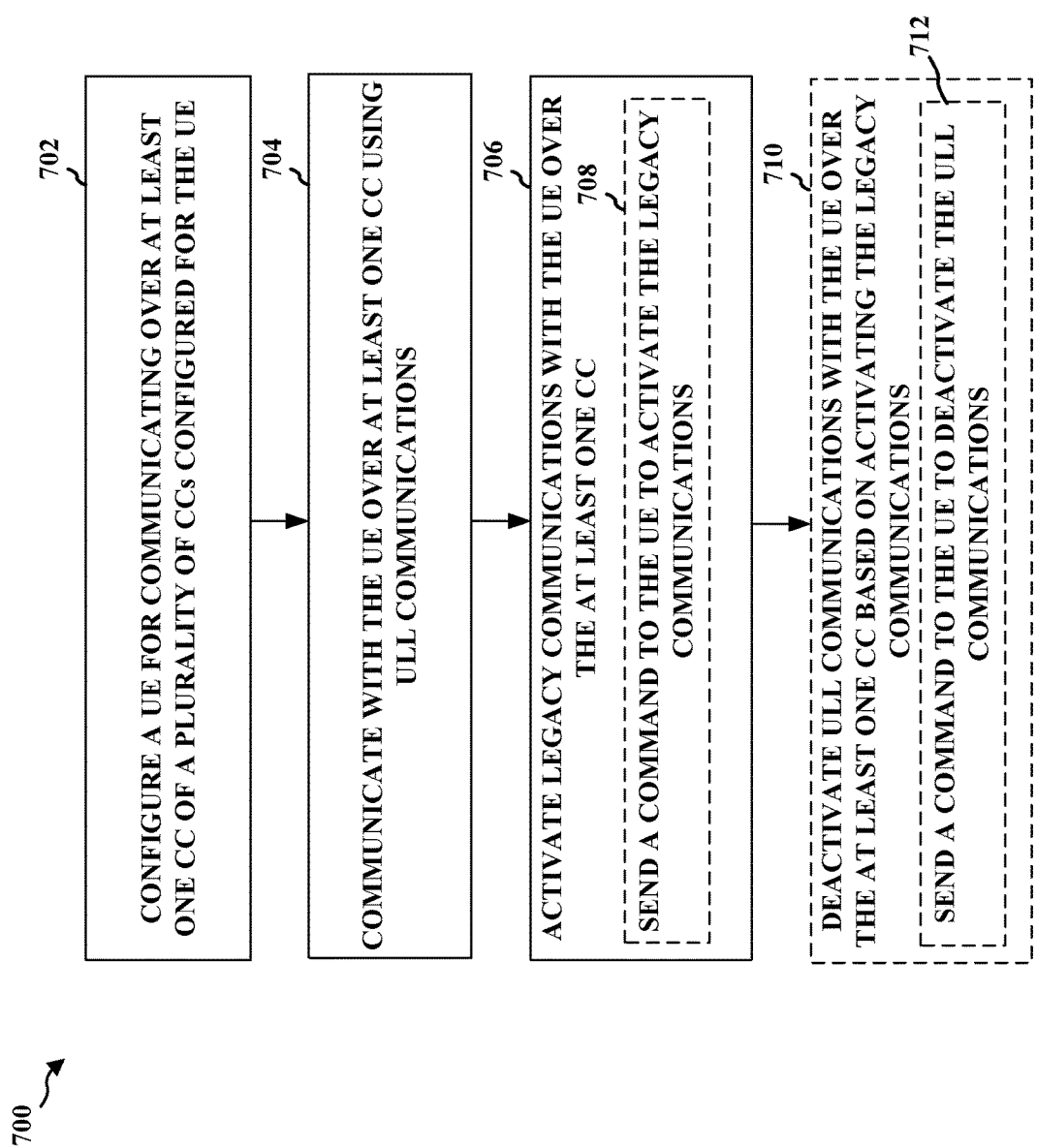
FIG. 7 is a flow chart of an example method of configuring communications using a ULL and/or a legacy communication technology over a plurality of CCs in accordance with aspects described herein.

Referring to FIGS. 5-7, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6 and 7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 5 illustrates an example system 500 for allocating resources for legacy and ULL wireless communications. System 500 includes a UE 502 that communicates with an eNB 504 to access a wireless network, examples of which are described in FIGS. 1-3 (e.g., access points 105, eNB 204, 208, eNB 310, UEs 115, 206, 350, etc.), above. In an aspect, eNB 504 and UE 502 can communicate over a plurality of CCs 508, 509 (and/or additional CCs) using carrier aggregation. For each CC 508, 509, for example, eNB 504 and UE 502 may have established one or more downlink channels over which to communicate downlink signals, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals for each CC 508, 509, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources. In another example, UE 502 may communicate with eNB 504 over one CC 508 and another eNB (or another cell provided by eNB 504) over another CC 509, may communicate with both eNBs (or cells) over multiple CCs, etc., though not shown in this Figure. Moreover, for example, UE 502 and/or eNB 504 can configure one CC 508 as a PCell CC and one or more other CCs 509 as an SCell CC in carrier aggregation and/or multiple connectivity. In addition, in an example, each CC 508 and/or 509 can be a set of CCs including a separate uplink CC and downlink CC.

In an aspect, UE 502 may include one or more processors 503 and/or a memory 505 that may be communicatively coupled, e.g., via one or more buses 507, and may operate in conjunction with or otherwise implement a communicating component 361 for receiving resource grants from eNB 504 and communicating over the resources, which may be based on a ULL timeline (e.g., a timeline having a TTI that is less than a subframe in duration, such as the timelines 400, 402 in FIG. 4), a legacy timeline (e.g., a timeline with a 1 ms subframe TTI), etc. For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a configuration receiving component 510 for obtaining a configuration for communicating over a plurality of CCs with one or more cells (e.g., with one or more eNBs 504) using carrier aggregation, multiple connectivity, etc. In an aspect, for example, configuration receiving component 510 may include hardware (e.g., one or more processor modules of the one or more processors 503) and/or computer-readable code or instructions stored in memory 505 and executable by at least one of the one or more processors 503 to perform the specially configured configuration receiving operations described herein. Further, for instance, the one or more processors 503 and/or memory 505 may execute actions or operations defined by an optional communication activating/deactivating component 512 for activating and/or deactivating legacy and/or ULL communications with eNB 504. In an aspect, for example, communication activating/deactivating component 512 may include hardware (e.g., one or more processor modules of the one or more processors 503) and/or computer-readable code or instructions stored in memory 505 and executable by at least one of the one or more processors 503 to perform the specially configured activating/deactivating operations described herein. Further, for instance, the one or more processors 503 and/or memory 505 may execute actions or operations defined by an optional latency determining component 514 for determining a latency for activating/deactivating the communications. In an aspect, for example, latency determining component 514 may include hardware (e.g., one or more processor modules of the one or more processors 503) and/or computer-readable code or instructions stored in memory 505 and executable by at least one of the one or more processors 503 to perform the specially configured latency determining operations described herein.

Similarly, in an aspect, eNB 504 may include one or more processors 553 and/or a memory 555 that may be communicatively coupled, e.g., via one or more buses 557, and may operate in conjunction with or otherwise implement a scheduling component 302 for generating the resource grants for UE 502 and/or other UEs according to the resources, which may be based on a ULL timeline (e.g., a timeline having a TTI that is less than a subframe in duration, such as the timelines 400, 402 in FIG. 4), a legacy timeline (e.g., a timeline with a 1 ms subframe TTI), etc. For example, the various functions related to scheduling component 302 may be implemented or otherwise executed by one or more processors 553 and, in an aspect, can be executed by a single processor, while in other aspects, different ones of the functions may be executed by a combination of two or more different processors, as described above. It is to be appreciated, in one example, that the one or more processors 553 and/or memory 555 may be configured as described in examples above with respect to the one or more processors 503 and/or memory 505 of UE 502.

In an example, the one or more processors 553 and/or memory 555 may execute actions or operations defined by scheduling component 302 or its subcomponents. For instance, the one or more processors 553 and/or memory 555 may execute actions or operations defined by a configuring component 520 for configuring legacy and/or ULL communications for UE 502 over at least one CC, where the UE 502 can otherwise be configured over multiple CCs with eNB 504 or other eNBs/cells in carrier aggregation or multiple connectivity. In an aspect, for example, configuring component 520 may include hardware (e.g., one or more processor modules of the one or more processors 553) and/or computer-readable code or instructions stored in memory 555 and executable by at least one of the one or more processors 553 to perform the specially configured communication configuring operations described herein. Further, for instance, the one or more processors 553 and/or memory 555 may execute actions or operations defined by an optional communication activating/deactivating component 522 for activating/deactivating legacy and/or ULL communications with the UE 502 over the at least one CC. In an aspect, for example, communication activating/deactivating component 522 may include hardware (e.g., one or more processor modules of the one or more processors 553) and/or computer-readable code or instructions stored in memory 555 and executable by at least one of the one or more processors 553 to perform the specially configured activating/deactivating operations described herein.

It is to be appreciated that transceivers 506, 556 may be configured to transmit and receive wireless signals through one or more antennas, an RF front end, one or more transmitters, and one or more receivers. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals and/or downlink signals over related uplink or downlink communication channels over the one or more CCs.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

FIG. 6 illustrates an example method 600 for managing (e.g., by a UE 502) legacy and/or ULL communications with one or more cells. At Block 602, the UE 502 may receive a configuration for aggregating a set of CCs. In such an aspect, set of CCs may include at least a primary cell CC and a secondary cell CC. In an aspect, configuration receiving component 510 (FIG. 5), e.g., in conjunction with processor (s) 503, memory 505, and/or transceiver 506, can receive the configuration for aggregating a set of CCs. In such an aspect, the set of CCs may include at least a primary cell CC and a secondary cell CC. In one example, configuration receiving component 510 can receive the configuration for the set of CCs from eNB 504 and/or may receive the configuration for one or a subset of the set of CCs configured for UE 502 from eNB 504. The configuration may specify a frequency band for the CCs, cell information assigned to the CCs, a communication technology for the CCs (e.g., legacy and/or ULL), resources over which to communicate using the CCs, and/or the like. In one example, configuration receiving component 510 can receive the configuration from the eNB 504, which can specify utilization of legacy and/or ULL communications over the CC where the legacy and/or ULL communications can relate to one or more of uplink or downlink communications over the CC. In an example, the configuration can relate to a PCell CC and one or more SCell CCs in carrier aggregation (e.g., with cells of eNB 504 and/or other eNBs) and/or multiple connectivity (e.g., with multiple PCell CCs and corresponding SCell CC(s)). In an example, the PCell CC can include a common search space over which the UE 502 can search for resource grants on the PCell CC and/or one or more SCell CCs.

At Block 604, the UE 502 may communicate, based on the received configuration, with at least the primary cell for legacy communications. In an aspect, communicating component 361, e.g., in conjunction with processor(s) 503, memory 505, and/or transceiver 506, can communicate, based on the received configuration, with at least the primary cell for legacy communications. As described, the legacy communications can be based on a first TTI of a first duration that is more than a second duration of a second TTI upon which ULL communications are based. In an example, communicating component 361 can communicate with eNB 504 over a primary cell CC (e.g., CC 508). As described, for example, the configuration can specify one or more parameters related to communicating over the primary cell (e.g., frequency band, cell information, communication technology, resources for uplink/downlink control and/or data communications, etc.). Thus, communicating component 361 can utilize the one or more parameters to communicate with the eNB 504 using the primary cell (e.g., over CC 508) using at least legacy communications (e.g., legacy LTE). In one example, UE 502 may receive the configuration over the primary cell communications with eNB 504 (e.g., over CC 508).

At Block 606, the UE 502 may communicate, based on the received configuration, with at least one of the primary cell or the secondary cell for ULL communications. In an aspect, communicating component 361, e.g., in conjunction with processor(s) 503, memory 505, and/or transceiver 506, can communicate, based on the received configuration, with at least one of the primary cell or the secondary cell for ULL communications. This can include communicating with eNB 504 over a primary cell CC and secondary cell CC (e.g., CCs 508, 509, respectively), and/or can include communicating with eNB 504 over a primary cell CC and another eNB (not shown) that provides one of the cells over a secondary cell CC. As described, for example, the configuration can specify one or more parameters related to communicating over the primary and secondary cells (e.g., frequency band, cell information, communication technology, resources for uplink/downlink control and/or data communications, etc.). Thus, communicating component 361 can utilize the one or more parameters to communicate with the eNB 504 using the primary cell (e.g., over CC 508) and/or the secondary cell (e.g., over CC 509) using at least ULL communications (e.g., ULL LTE). For example, ULL LTE communications can be based on a TTI that is 1 symbol, 2 symbols, 1 slot, etc. durations, where legacy LTE may be based on a TTI that is 1 subframe in duration. Accordingly, communicating component 361 can separately manage legacy and/or ULL communications over a plurality of CCs.

In one example, communicating component 361 can communicate over the primary cell (and/or a second primary cell carrying PUCCH/uPUCCH, referred to herein as a pScell) using ULL and legacy LTE (which may include monitoring for communications over the primary cell CC 508 using ULL and legacy LTE) while communicating with the secondary cell using at least ULL LTE (which may include monitoring for communications over the secondary cell CC 509 using at least ULL LTE). In another example, communicating component 361 can communicate over the secondary cell using legacy LTE (which may include monitoring for communications over the secondary cell CC 509 using at least legacy LTE). Thus, for example, communicating component 361 may communicate with a PCell and an SCell (e.g., of eNB 504 and/or one or more other eNBs), or related PCell CC or SCell CC, based on one or more of the following communication type configurations: (1) PCell using a legacy technology and SCell using a ULL (and legacy) technology; (2) PCell using a ULL (and legacy) technology and SCell using a legacy technology; or (3) PCell using a ULL (and legacy) technology and SCell using a ULL (and legacy) technology. It is to be appreciated that additional configurations are possible for more than 2 CCs and/or in multiple connectivity. In an example, though communicating component 361 can monitor, based on the received configuration, legacy LTE over the SCell for communications, the SCell may provide ULL communications to other UEs over other CCs. Similarly, though communicating component 361 can monitor, based on the received configuration, ULL LTE over the SCell for communications, the SCell may provide legacy communications to other UEs over other CCs.

In addition, the communication type configuration may be based in part on subframe/frame configurations over the CCs (e.g., since different CCs can have different uplink/downlink subframe configurations and/or different frame structures, such as FDD or TDD). In addition, in an example, communicating component 361 may communicate with the PCell and/or SCell using a legacy technology on an uplink portion of a CC 508, 509 and a ULL (and legacy) technology on a downlink portion of the CC 508, 509, and/or vice versa.

In an example, at Block 608, the UE 502 may optionally receive an activation command for activating legacy communications with the primary cell or the secondary cell and/or a deactivation command for deactivating ULL communications with the primary cell or the secondary cell. In an aspect, communication activating/deactivating component 512, e.g., in conjunction with processor(s) 503, memory 505, and/or transceiver 506, may receive the activation command for activating legacy communications with the primary cell or the secondary cell and/or a deactivation command for deactivating ULL communications with the primary cell or the secondary cell (e.g., from eNB 504, as described further herein). For example, communicating component 361 may receive the activation command and/or the deactivation command in legacy and/or ULL resources over the primary cell (e.g., primary cell CC 508), secondary cell (e.g., secondary cell CC 509), and/or other CCs. In one example, communication activating/deactivating component 512 can request activation/deactivation of legacy and/or ULL communications in the secondary cell from eNB 504. Communication activating/deactivating component 512 can accordingly activate legacy communications and/or deactivate ULL communications over the secondary cell CC 509 (e.g., over a corresponding uplink and/or downlink CC). This may include refraining from monitoring for ULL communications (e.g., at the TTI of the ULL communications) over the secondary cell CC 509, refraining from transmitting ULL communications over the secondary cell CC 509, etc. In this regard, latency for establishing legacy communications using ULL communications over the CC can be less than establishing the CC altogether in the secondary cell.

In addition, in an example, where ULL communications are deactivated, communication activating/deactivating component 512 may receive a command to activate the ULL communications over the secondary cell CC 509 from the eNB 504 or another eNB related to the secondary cell CC 509 (and/or a command to deactivate the legacy communications in the secondary cell). Communication activating/deactivating component 512 can accordingly activate ULL communications and/or deactivate legacy communications in the secondary cell CC 509 based on the command(s). In this regard, latency for establishing ULL communications using legacy communications over the CC can be less than establishing the CC altogether in the secondary cell. Moreover, the activation/deactivation commands in any case may apply to downlink communications (e.g. over a downlink CC portion of the secondary cell CC 509), uplink communications (e.g., over an uplink CC portion of the secondary cell CC 509), both, etc.

As described, for example, ULL or legacy communications can be activated and/or deactivated for one of downlink or uplink communications, or for both downlink and uplink communications in the secondary cell. When ULL or legacy communications are activated and/or deactivated for downlink or uplink, the ULL or legacy configuration can also be subframe dependent (e.g., legacy only communications activated in some subframes while legacy and ULL are activated in other subframes depending on whether the subframes are configured for downlink and/or uplink communications).

At Block 610, the UE 502 may optionally determine a latency for activating legacy communications with the primary cell or the secondary cell (e.g., over the corresponding CC 509) or deactivating ULL communications with the primary cell or the secondary cell. In an aspect, latency determining component 514, e.g., in conjunction with processor(s) 503 and/or memory 505, can determine the latency for activating legacy communications with the primary cell or the secondary cell or deactivating ULL communications with the primary cell or the secondary cell. For example, where the UE 502 is not communicating with the secondary cell, latency determining component 514 can determine a longer latency for activating legacy communications than where the UE 502 is communicating with the secondary cell before activating the legacy communications. In another example, where the UE 502 is not communicating with the secondary cell after deactivating the ULL communications, latency determining component 514 can determine a longer latency for deactivating legacy communications than where the UE 502 continues communicating with the secondary cell (e.g., using legacy communications) after deactivating the ULL communications. It is to be appreciated that latencies can be similarly determined for reactivation of ULL communications and/or deactivation of legacy communications.

In yet another example, latency determining component 514 can determine the latency for activating or deactivating legacy or ULL communications on the secondary cell (e.g., over the corresponding CC 509) based on whether the activation or deactivation command is for legacy communications (e.g., based on the first TTI) or ULL communications (e.g., based on the second TTI). For example, where the activation/deactivation command is for ULL communications, latency determining component 514 can determine a shorter latency than when the activation/deactivation command is for legacy communications. In another example, latency determining component 514 may determine the latency based on whether the UE 502 communicates with the secondary cell using at least one TTI before and after the activating and/or deactivating. In any case, communicating component 361 can utilize the latency in determining when (e.g., in what TTI) to communicate (e.g., transmit and/or receive) over activated resources and/or refrain from communicating over deactivated resources.

FIG. 7 illustrates an example method 700 for communicating (e.g., by an eNB 504) with a UE using legacy and/or ULL communications. At Block 702, the eNB may configure a UE for communicating over at least one CC of a plurality of CCs configured for the UE. In an aspect, configuring component 520 (FIG. 5), e.g., in conjunction with processor(s) 553, memory 555, and/or transceiver 556, can configure the UE 502 for communicating over at least one CC of a plurality of CCs configured for the UE 502. For example, configuring component 520 can specify information for communicating with a primary cell over CC 508 and/or with a secondary cell (e.g., associated with the eNB 504 or another eNB) over CC 509 in carrier aggregation and/or in multiple connectivity. As described, for example, the information can include frequency band, cell information, communication technology, resources for uplink/downlink control and/or data communications, or other parameters.

At Block 704, the eNB 504 may communicate with the UE over at least one CC using ULL communications. In an aspect, scheduling component 302, e.g., in conjunction with processor(s) 553, memory 555, and/or transceiver 556, can communicate with the UE 502 over at least one CC 508 and/or 509 using ULL communications, as described above (e.g., based on a ULL timeline). This can be based at least in part on the configuration sent to the UE 502.

At Block 706, the eNB 504 may activate legacy communications with the UE over the at least one CC. In an aspect, communication activating/deactivating component 522, e.g., in conjunction with processor(s) 553, memory 555, and/or transceiver 556, can activate legacy communications with the UE 502 over the at least one CC 508, 509. For example, in activating the legacy communications at Block 706, the eNB 504 may optionally, at Block 708, send a command to the UE to activate the legacy communications. In an aspect, communication activating/deactivating component 522, e.g., in conjunction with processor(s) 553, memory 555, and/or transceiver 556, may send the command to the UE 502 to activate the legacy communications. For example, communication activating/deactivating component 522 can transmit the command to the UE 502 using ULL communications therewith (e.g., over CC 508 and/or 509).

At Block 710, the eNB 504 may optionally deactivate ULL communications with the UE over the at least one CC based on activating the legacy communications. In an aspect, communication activating/deactivating component 522, e.g., in conjunction with processor(s) 553, memory 555, and/or transceiver 556, can deactivate the ULL communications with the UE 502 over at least one CC 508, 509 based on activating the legacy communications. For example, in deactivating the ULL communications at Block 710, the eNB 504 may optionally, at Block 712, send a command to the UE to deactivate the ULL communications. In an aspect, communication activating/deactivating component 522, e.g., in conjunction with processor(s) 553, memory 555, and/or transceiver 556, can transmit the command to the UE 502 using the ULL or legacy communications (e.g., over CC 508 and/or 509). It is to be appreciated that eNB 504 can maintain ULL communications with other UEs when deactivating ULL communications with UE 502.

In addition, communication activating/deactivating component 522 can similarly activate ULL and/or deactivate legacy communications in the secondary cell for UE 502 as well, which may include sending related commands to the UE 502. In any case, in an example, communication activating/deactivating component 522 may determine to activate/deactivate ULL and/or legacy communications based on a request from the UE 502, based on a buffer status report from the UE 502, etc. For example, where the eNB 504 receives a buffer status report from the UE 502 indicating a buffer status below a threshold capacity where ULL communications are active, communication activating/deactivating component 522 may deactivate ULL communications and/or activate legacy communications over the secondary cell CC 509 for UE 502 (e.g., and/or may deactivate the secondary cell CC 509 altogether). Similarly, for example, where the eNB 504 receives a buffer status report from the UE 502 indicating a buffer status achieves a threshold capacity where legacy communications are active, communication activating/deactivating component 522 may activate ULL communications and/or deactivate legacy communications over the secondary cell CC 509 for UE 502. In addition, in an example, communication activating/deactivating component 522 can activate/deactivate legacy and/or ULL communications based on a type of traffic to be communicated over the secondary cell CC 509 (e.g., activate ULL communications for media traffic, activate legacy communications for traffic having lower bandwidth requirements, etc.).

Accordingly, the eNB 504 can configure ULL and/or legacy communications over a given CC 508, 509 with UE 502 in carrier aggregation. It is to be appreciated that one CC (e.g., primary cell CC 508) can utilize ULL and legacy communications while another CC (e.g., secondary cell CC 509) can utilize ULL or legacy communications. The eNB 504 can accordingly activate and/or deactivate ULL or legacy communications as described herein. It is also to be appreciated that a CC may be configured ULL only for a direction (e.g., downlink ULL) while relying on a different CC for ULL of a different direction (e.g., uplink ULL). For example, a CC that a UE monitors for a common search space, e.g., the primary cell CC 508, a primary second CC (pScell) that may carry control channels, etc., may be restricted such that ULL is to be configured for both links (downlink and uplink) if configured. It is also to be appreciated that the primary cell CC configured for legacy communication can be restricted to be the same as the primary cell CC for ULL communication. Alternatively, the primary cell CC for legacy communication and the primary cell CC for ULL communication can be separately managed and configured, as described herein. As an example, a UE may be configured with 3 CCs: CC1, CC2, and CC3. CC1 may be configured as the primary cell CC for legacy communication, while CC2 may be configured as the primary cell CC for ULL communication. CC3 may be configured as a secondary cell CC. Thus, in an example as described herein, communication activating/deactivating component 512 may receive instructions over CC1 for activating/deactivating ULL communications on CC2, and/or vice versa. In any case, as described, one or more eNBs may provide the configuration to the UE (e.g., as described with respect to Block 602 and/or 702 above).

In addition, cross-carrier scheduling may be enabled for ULL communication. That is, a ULL control channel can be transmitted over a CC (e.g., primary cell CC 508 by eNB 504) for scheduling ULL communication (downlink or uplink) on a different CC (e.g., secondary cell CC 509). It is also possible that a ULL communication (downlink or uplink) may be scheduled for a CC by a control channel associated with legacy communication on the CC or another CC (e.g., by eNB 504). Similarly, it is also possible that a legacy communication (downlink or uplink) may be scheduled by a control channel associated with ULL communication.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of managing ultra low latency (ULL) communications over a plurality of component carriers (CC), comprising:
    receiving a configuration for aggregating a set of CCs, wherein the set of CCs includes at least a primary cell and a secondary cell;
    communicating, based on the received configuration, with at least the primary cell for legacy communications, wherein the legacy communications are based on a first transmission time interval (TTI) having a first duration;
    communicating, based on the received configuration, with at least one of the primary cell or the secondary cell for ULL communications, wherein the ULL communications are based on a second TTI having a second duration that is less than the first duration;
    receiving a deactivation command for ULL communications with the at least one of the primary cell or the secondary cell; and
    receiving an activation command for activating legacy communications with the secondary cell, along with deactivating ULL communications with the secondary cell.

2. The method of claim 1, further comprising:
    communicating, based on the received configuration, with the secondary cell for legacy communications.

3. The method of claim 1, further comprising determining a latency for activating or deactivating legacy or ULL communications with the at least one of the primary cell or the secondary cell, where the latency is a function of at least one of:
    whether the activating or the deactivating is for communications based on the first TTI or the second TTI, or
    whether the UE communicates with a cell using at least one TTI before and after the activating or the deactivating.

4. The method of claim 3, wherein determining the latency comprises at least one of:
    determining a first latency when the UE is not communicating with the cell using legacy communications or ULL communications before the activating; or
    determining a second latency when the UE is communicating with the cell using one of legacy communications or ULL communications before the activating, where the second latency is less the first latency.

5. The method of claim 3, wherein determining the latency comprises at least one of:
    determining a first latency when the UE is not communicating with the cell using legacy communications or ULL communications after the deactivating; or
    determining a second latency when the UE is communicating with the cell using one of legacy communications or ULL communications after the deactivating, where the second latency is less the first latency.

6. The method of claim 1, wherein communicating with the at least one of the primary cell or the secondary cell for ULL communications comprises communicating with the at least one of the primary cell or the secondary cell using the ULL communications for both downlink communications and uplink communications.

7. The method of claim 1, wherein communicating with the at least one of the primary cell or the secondary cell for ULL communications comprises communicating with the at least one of the primary cell or the secondary cell using the ULL communications for either downlink communications or uplink communications.

8. The method of claim 1, wherein the second TTI comprises at least one of one symbol, two symbols, or a slot.

9. An apparatus for managing ultra low latency (ULL) communications over a plurality of component carriers (CC), comprising:
    at least one processor; and
    a memory communicatively coupled with the at least one processor;
    wherein the at least one processor is configured to:
        receive a configuration for aggregating a set of CCs, wherein the set of CCs includes at least a primary cell and a secondary cell;
        communicate, based on the received configuration, with at least the primary cell for legacy communications, wherein the legacy communications are based on a first transmission time interval (TTI) having a first duration;
        communicate, based on the received configuration, with at least one of the primary cell or the secondary cell for ULL communications, wherein the ULL communications are based on a second TTI having a second duration that is less than the first duration;
        receive a deactivation command for ULL communications with at least one of the primary cell or the secondary cell; and
        receive an activation command for activating legacy communications with the at least one of the primary cell or the secondary cell, along with deactivating ULL communications with the at least one of the primary cell or the secondary cell.

10. The apparatus of claim 9, wherein the at least one processor is further configured to communicate, based on the received configuration, with the secondary cell for legacy communications.

11. The apparatus of claim 9, wherein the at least one processor is further configured to determine a latency for activating or deactivating legacy or ULL communications with the at least one of the primary cell or the secondary cell, where the latency is a function of at least one of:
    whether the activating or the deactivating is for communications based on the first TTI or the second TTI, or
    whether the UE communicates with a cell using at least one TTI before and after the activating or the deactivating.

12. The apparatus of claim 11, wherein the latency is determined to be:
    a first latency when the UE is not communicating with the cell using legacy communications or ULL communications before the activating; or
    a second latency when the UE is communicating with the cell using one of legacy communications or ULL communications before the activating, where the second latency is less the first latency.

13. The apparatus of claim 11, wherein the latency is determined to be:
    a first latency when the UE is not communicating with the cell using legacy communications or ULL communications after the deactivating; or
    a second latency when the UE is communicating with the cell using one of legacy communications or ULL communications after the deactivating, where the second latency is less the first latency.

14. The apparatus of claim 9, wherein the at least one processor is configured to communicate with the at least one of the primary cell or the secondary cell for ULL communications at least in part by communicating with the at least one of the primary cell or the secondary cell using ULL communications for both downlink communications and uplink communications.

15. The apparatus of claim 9, wherein the at least one processor is configured to communicate with the at least one of the primary cell or the secondary cell using ULL communications for either downlink communications or uplink communications.

16. The apparatus of claim 9, wherein the second TTI comprises at least one of one symbol, two symbols, or a slot.

17. An apparatus for managing ultra low latency (ULL) communications over a plurality of component carriers (CC), comprising:
 means for receiving a configuration for aggregating a set of CCs, wherein the set of CCs includes at least a primary cell and a secondary cell;
 means for communicating, based on the received configuration, with at least the primary cell for legacy communications, wherein the legacy communications are based on a first transmission time interval (TTI) having a first duration;
 means for communicating, based on the received configuration, with at least one of the primary cell or the secondary cell for ULL communications, wherein the ULL communications are based on a second TTI having a second duration that is less than the first duration;
 means for receiving a deactivation command for ULL communications with the at least one of the primary cell or the secondary cell; and
 means for receiving an activation command for activating legacy communications with the secondary cell, along with deactivating ULL communications with the secondary cell.

18. The apparatus of claim 17, further comprising:
 means for communicating, based on the received configuration, with the secondary cell for legacy communications.

19. The apparatus of claim 17, further comprising means for determining a latency for activating or deactivating legacy or ULL communications with the at least one of the primary cell or the secondary cell, where the latency is a function of at least one of:
 whether the activating or the deactivating is for communications based on the first TTI or the second TTI, or
 whether the apparatus communicates with a cell using at least one TTI before and after the activating or the deactivating.

20. The apparatus of claim 19, wherein the means for determining the latency determines the latency at least in part by:
 determining a first latency when the apparatus is not communicating with the cell using legacy communications or ULL communications before the activating; or
 determining a second latency when the apparatus is communicating with the cell using one of legacy communications or ULL communications before the activating, where the second latency is less the first latency.

21. The apparatus of claim 17, wherein the means for communicating with the at least one of the primary cell or the secondary cell for ULL communications communicates with the at least one of the primary cell or the secondary cell using the ULL communications for both downlink communications and uplink communications.

22. The apparatus of claim 17, wherein the means for communicating with the at least one of the primary cell or the secondary cell for ULL communications communicates with the at least one of the primary cell or the secondary cell using the ULL communications for either downlink communications or uplink communications.

23. The apparatus of claim 17, wherein the second TTI comprises at least one of one symbol, two symbols, or a slot.

24. A non-transitory computer-readable storage medium comprising computer-executable code to manage ultra low latency (ULL) communications over a plurality of component carriers (CC), comprising code to:
 receive a configuration for aggregating a set of CCs, wherein the set of CCs includes at least a primary cell and a secondary cell;
 communicate, based on the received configuration, with at least the primary cell for legacy communications, wherein the legacy communications are based on a first transmission time interval (TTI) having a first duration;
 communicate, based on the received configuration, with at least one of the primary cell or the secondary cell for ULL communications, wherein the ULL communications are based on a second TTI having a second duration that is less than the first duration;
 receive a deactivation command for ULL communications with the at least one of the primary cell or the secondary cell; and
 receive an activation command for activating legacy communications with the secondary cell, along with deactivating ULL communications with the secondary cell.

25. The non-transitory computer-readable storage medium of claim 24, further comprising code to:
 communicate, based on the received configuration, with the secondary cell for legacy communications.

26. The non-transitory computer-readable storage medium of claim 24, further comprising code to determine a latency for activating or deactivating legacy or ULL communications with the at least one of the primary cell or the secondary cell, where the latency is a function of at least one of:
 whether the activating or the deactivating is for communications based on the first TTI or the second TTI, or
 whether the apparatus communicates with a cell using at least one TTI before and after the activating or the deactivating.

27. The non-transitory computer-readable storage medium of claim 26, wherein the code to determine the latency determines the latency at least in part by:
 determining a first latency when the apparatus is not communicating with the cell using legacy communications or ULL communications before the activating; or
 determining a second latency when the apparatus is communicating with the cell using one of legacy communications or ULL communications before the activating, where the second latency is less the first latency.

28. The non-transitory computer-readable storage medium of claim 24, wherein the code to communicate with the at least one of the primary cell or the secondary cell for ULL communications communicates with the at least one of the primary cell or the secondary cell using the ULL communications for both downlink communications and uplink communications.

29. The non-transitory computer-readable storage medium of claim 24, wherein the code to communicate with the at least one of the primary cell or the secondary cell for ULL communications communicates with the at least one of the primary cell or the secondary cell using the ULL communications for either downlink communications or uplink communications.

30. The non-transitory computer-readable storage medium of claim 24, wherein the second TTI comprises at least one of one symbol, two symbols, or a slot.

* * * * *